(12) United States Patent
Takesue et al.

(10) Patent No.: US 12,155,253 B2
(45) Date of Patent: Nov. 26, 2024

(54) VEHICLE

(71) Applicants: TOYOTA JIDOSHA KABUSHIKI KAISHA, Toyota (JP); SUBARU CORPORATION, Tokyo (JP)

(72) Inventors: Ippei Takesue, Nisshin (JP); Yo Masuda, Musashino (JP); Kazuya Fuke, Mitaka (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 15 days.

(21) Appl. No.: 18/205,684

(22) Filed: Jun. 5, 2023

(65) Prior Publication Data

US 2024/0022100 A1   Jan. 18, 2024

(30) Foreign Application Priority Data

Jul. 14, 2022   (JP) .................................. 2022-113058

(51) Int. Cl.

| | |
|---|---|
| *H02J 7/00* | (2006.01) |
| *B60R 16/033* | (2006.01) |
| *H01M 10/46* | (2006.01) |
| *H01M 10/625* | (2014.01) |
| *H01M 10/633* | (2014.01) |
| *H01M 10/657* | (2014.01) |

(52) U.S. Cl.
CPC ............. *H02J 7/007* (2013.01); *H01M 10/46* (2013.01); *H01M 10/625* (2015.04); *H01M 10/633* (2015.04); *H01M 10/657* (2015.04); *H02J 7/00032* (2020.01); *B60R 16/033* (2013.01); *H01M 2220/20* (2013.01)

(58) Field of Classification Search
CPC ...... H02J 7/007; H02J 7/00032; H01M 10/46; H01M 10/625; H01M 10/633; H01M 10/657; H01M 2220/20; H01M 10/443; H01M 10/615; B60R 16/033; Y02T 10/70; Y02T 10/7072; Y02T 90/14; B60L 58/27; B60L 58/10; B60L 2240/545
See application file for complete search history.

(56) References Cited

U.S. PATENT DOCUMENTS

| | | | |
|---|---|---|---|
| 2011/0043165 A1* | 2/2011 | Kinser .................... | B60L 58/26 320/109 |
| 2016/0347302 A1* | 12/2016 | Niwa .................. | B60H 1/00278 |
| 2019/0023150 A1* | 1/2019 | Ko .......................... | B60L 58/12 |

FOREIGN PATENT DOCUMENTS

JP   2021-154814 A   10/2021

* cited by examiner

*Primary Examiner* — Rexford N Barnie
*Assistant Examiner* — Thai H Tran
(74) *Attorney, Agent, or Firm* — Sughrue Mion, PLLC

(57) ABSTRACT

A vehicle includes a secondary battery, a heater configured to be able to raise a temperature of the secondary battery, and a charging control unit configured to be connectable to an external power source. The charging control unit is configured to be able to output electric power supplied from the external power source to the secondary battery and the heater when connected to the external power source. The charging control unit is configured to be able to request the external power source for a requested power amount, and to be able to receive a supply of a supplied power amount in accordance with the requested power amount from the external power source. The charging control unit requests the external power source for the requested power amount including a first power amount required for charging the secondary battery and a second power amount required for heating by the heater.

5 Claims, 6 Drawing Sheets

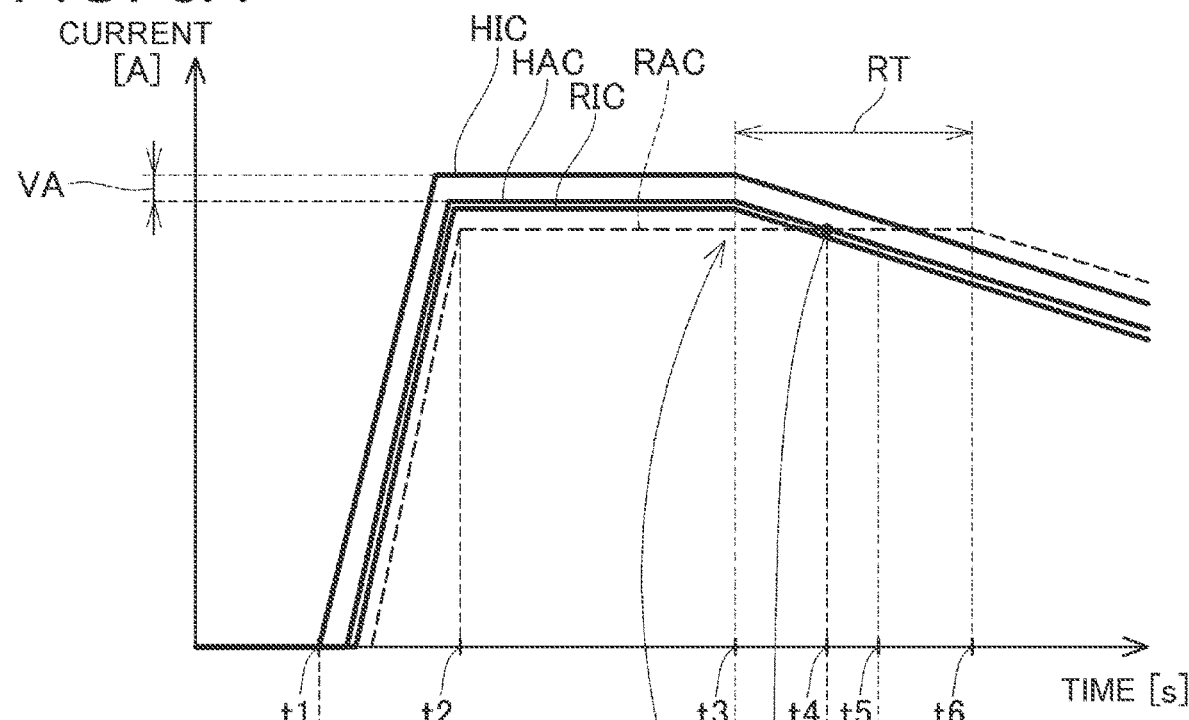
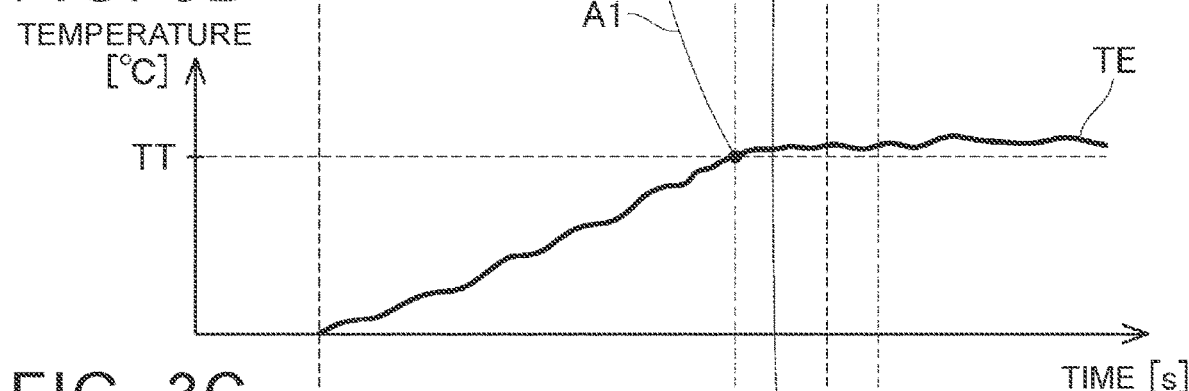
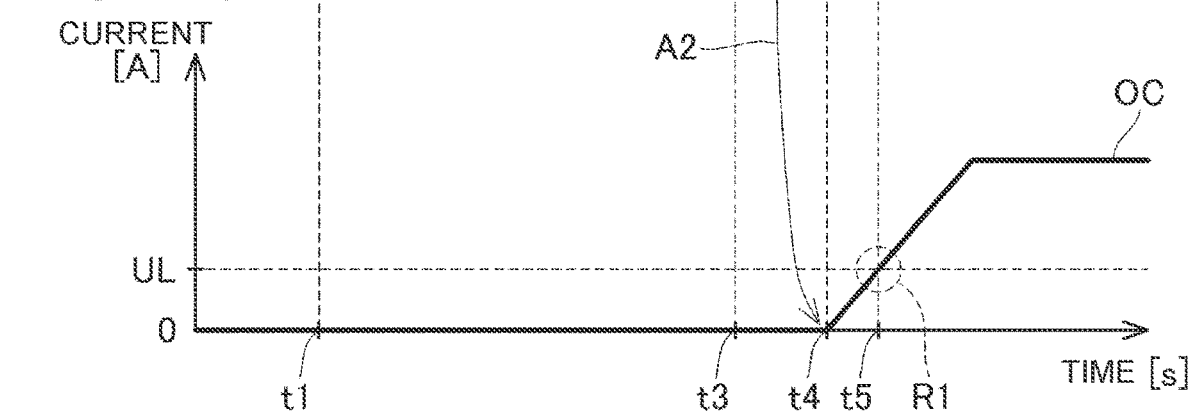

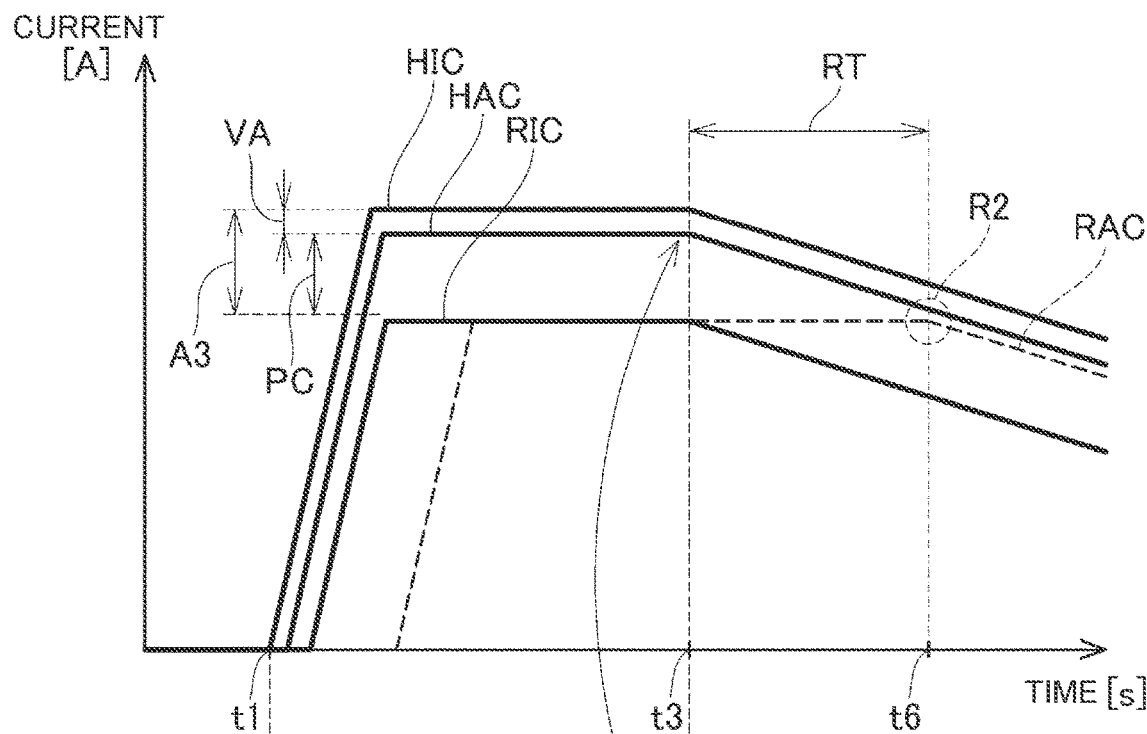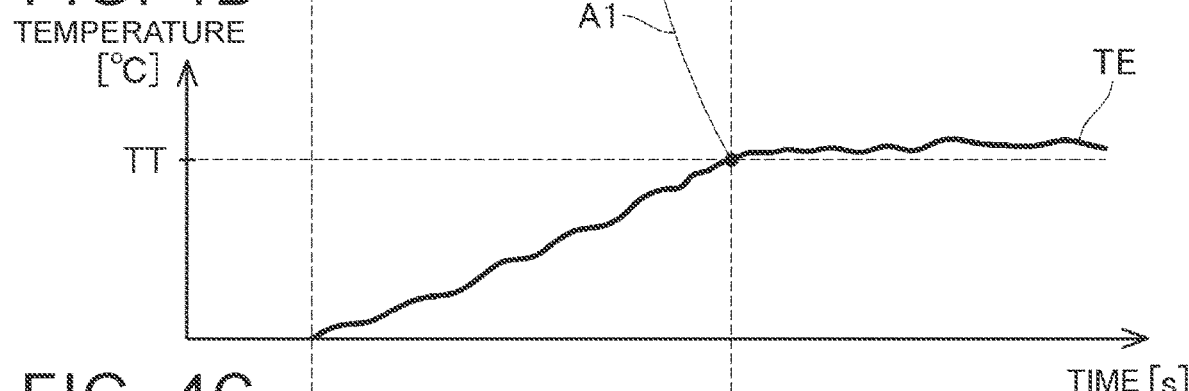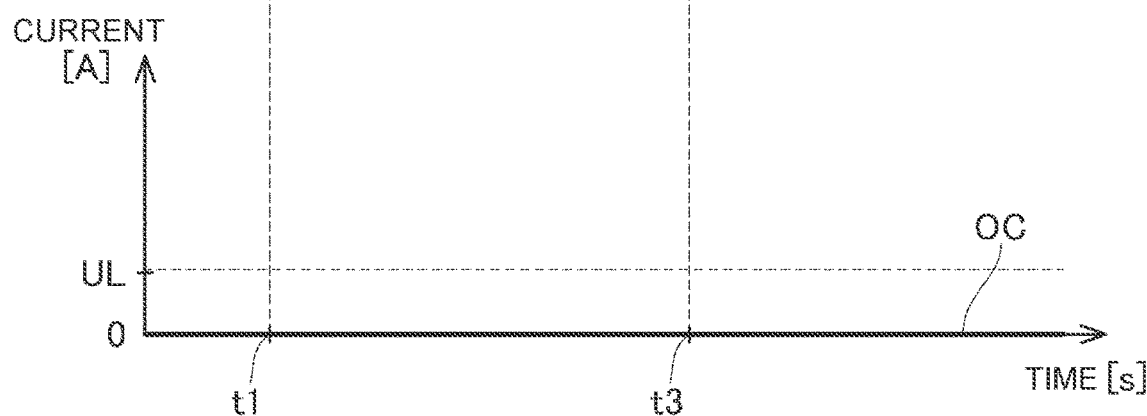

VEHICLE

CROSS-REFERENCE TO RELATED APPLICATION

This application claims priority to Japanese Patent Application No. 2022-113058 filed on Jul. 14, 2022, incorporated herein by reference in its entirety.

BACKGROUND

1. Technical Field

The technique disclosed in the present specification relates to a vehicle. In particular, the technique relates to a vehicle equipped with a secondary battery that can be charged by an external power source.

2. Description of Related Art

Japanese Unexamined Patent Application Publication No. 2021-154814 (JP 2021-154814 A) describes a technique for heating a battery provided in an electrified vehicle.

SUMMARY

While charging a secondary battery using an external power source, the supplied power amount to the secondary battery decreases when a part of the power amount used for charging the secondary battery is used to heat the secondary battery. As a result, the charging time becomes long.

A vehicle disclosed in the present specification includes a secondary battery, a heater configured to be able to raise a temperature of the secondary battery, and a charging control unit configured to be connectable to an external power source. The charging control unit is configured to be able to output electric power supplied from the external power source to the secondary battery and the heater when connected to the external power source. The charging control unit is configured to be able to request the external power source for a requested power amount, and to be able to receive a supply of a supplied power amount in accordance with the requested power amount from the external power source. The charging control unit requests the external power source for the requested power amount including a first power amount required for charging the secondary battery and a second power amount required for heating by the heater.

There may be various modes in which the requested power amount includes the first power amount and the second power amount. For example, the requested power amount may be the total value of the first power amount and the second power amount, or may be a value in which various corrections have been made to the total value (e.g., addition or subtraction of the margin power amount).

There may be various control methods of the power amount. A technique of controlling only one of the current value and the voltage value is also included in the control of the power amount of the present specification. For example, the control of the power amount in the present specification includes a technique of controlling the power amount by setting the voltage value to a constant value determined by the secondary battery and making the current value variable.

According to this configuration, it is possible to request, to the external power source, a power amount in which the second power amount required for heating by the heater is added to the first power amount required for charging the secondary battery, as the requested power amount. A large requested power amount can be requested compared to a case where only the first power amount is requested. When the secondary battery is charged by the external power source while being heated by the heater, a part of the first power amount required for charging the secondary battery will not be used for the heater operation.

The charging time can be suppressed from becoming long.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A is a diagram illustrating an issue in the control of a raising indicated current amount RIC;

FIG. 3B is a diagram illustrating the issue in the control of the raising indicated current amount RIC;

FIG. 3C is a diagram illustrating the issue in the control of the raising indicated current amount RIC;

FIG. 4A is a diagram illustrating a control method for the raising indicated current amount RIC according to a first embodiment;

FIG. 4B is a diagram illustrating the control method for the raising indicated current amount RIC according to the first embodiment;

FIG. 4C is a diagram illustrating the control method for the raising indicated current amount RIC according to the first embodiment;

DETAILED DESCRIPTION OF EMBODIMENTS

Figure 1:
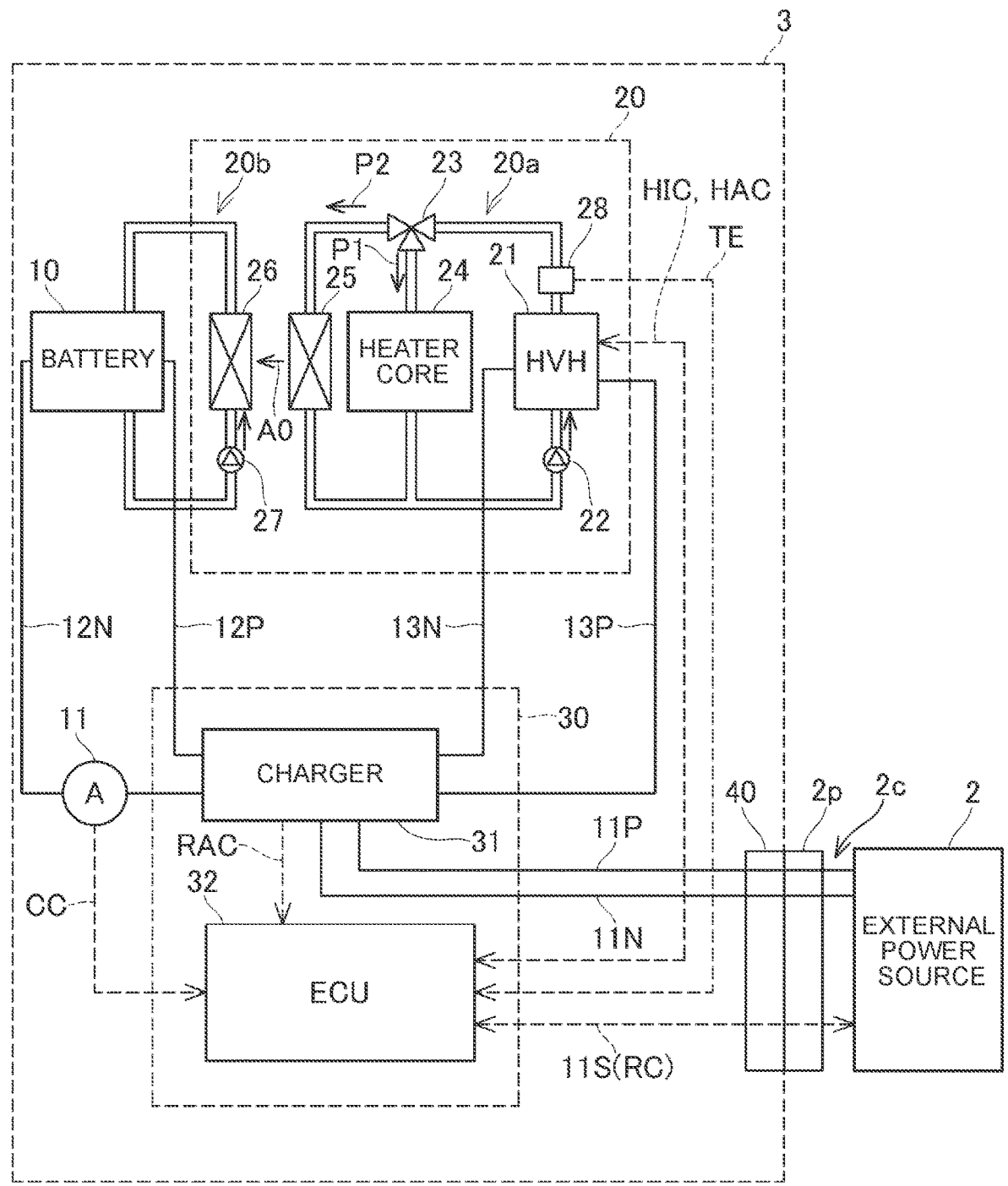
FIG. 1 is a schematic block diagram of a charging system 1 of the present embodiment.

Technical elements of a heat management device disclosed in the present specification are listed below. Each of the following technical elements is independently useful.

In one example of a vehicle disclosed in the present specification, there may be a response time that is the time from when a requested power amount is requested to an external power source until a supplied power amount is supplied by the external power source in response to the requested power amount that has been requested. A charging control unit may execute a processing of calculating a predetermined power amount corresponding to the response time. The charging control unit may execute a processing of acquiring an indicated power amount that indicates electric power consumed by a heater. The charging control unit may execute a processing of setting a power amount obtained by subtracting the predetermined power amount from the indicated power amount as a second power amount. In this configuration, the indicated power amount can be set lower in advance by the predetermined power amount corresponding to the response time. Therefore, even when there is a difference in the power amount of the predetermined power amount between the indicated power amount and the second power amount, the second power amount does not fall below the indicated power amount. As a result, it is possible to restrain the electric power that has not been consumed by the heater from flowing into the secondary battery. Therefore, the secondary battery can be protected.

In one example of the vehicle disclosed in the present specification, there may be a response time that is the time from when a requested power amount is requested to an external power source until a supplied power amount is supplied by the external power source in response to the requested power amount that has been requested. A charging control unit may execute a processing of calculating a predetermined power amount corresponding to the response time. The charging control unit may execute a processing of acquiring an indicated power amount that indicates electric power consumed by a heater. The charging control unit may execute a processing of acquiring an actually consumed power amount indicating electric power actually consumed by the heater. The charging control unit may execute a processing of setting, as the second power amount, a smaller power amount of a power amount obtained by subtracting the predetermined power amount from the indicated power amount and the actually consumed power amount. In this configuration, even when there is a difference in the power amount corresponding to the predetermined power amount between the indicated power amount and the second power amount, the second power amount does not fall below the indicated power amount. Also, the second power amount does not exceed the actually consumed power amount. As a result, it is possible to restrain the electric power that has not been consumed by the heater from flowing into the secondary battery. Therefore, the secondary battery can be protected.

In one example of the vehicle disclosed in the present specification, the maximum value of a change rate may be set in advance for the indicated power amount. The predetermined power amount may be a value equal to or greater than a value calculated by multiplying the maximum value of the change rate by the response time. In this configuration, it is possible to calculate the maximum value of the change amount in the indicated power amount within the response time.

In one example of the vehicle disclosed in the present specification, there may be a response time that is the time from when a requested power amount is requested to an external power source until a supplied power amount is supplied by the external power source in response to the requested power amount that has been requested. The maximum value of a decrease rate may be set in advance for the requested power amount. When a rapid decrease phenomenon occurs in which the requested power amount decreases beyond the maximum value of the decrease rate, the charging control unit may continue the operation of the heater until the response time or more has elapsed from the time when the rapid decrease phenomenon occurred. In this configuration, the heater can continue to consume electric power even when the requested power amount rapidly decreases. Therefore, the actually consumed power amount of the heater does not fall below the supplied power amount. This makes it possible to protect the secondary battery.

First Embodiment

Overview of Charging System 1

FIG. 1 shows a schematic block diagram of a charging system 1 of the embodiment. In FIG. 1, signal lines are indicated by dotted lines, power source lines are indicated by single solid lines, and medium flow paths are indicated by double solid lines. The charging system 1 includes an external power source 2 and a vehicle 3. The external power source 2 is, for example, a charging station or a household power source (commercial power source). The external power source 2 includes a charging cable 2c and a connection plug 2p. The external power source 2 may be a device that supplies direct current.

The vehicle 3 mainly includes a battery 10, a heater 20, a charging control unit 30 and an inlet 40. The inlet 40 is a connection port to which the connection plug 2p is connected. The charging control unit 30 includes a charger 31 and an electronic control unit (ECU) 32. The external power source 2 and the charger 31 are connected by power source lines 11P and 11N and a signal line 11S. The charger 31 and the battery 10 are connected by power source lines 12P and 12N. The charger 31 and an electric high voltage heater (HVH) 21 are connected by power source lines 13P and 13N.

The ECU 32 is a part that performs various controls such as a charge/discharge control of the battery 10 and a control of the heater 20. The ECU 32 transmits a requested current amount RC to the external power source 2 via the signal line 11S. The ECU 32 transmits an HVH indicated current amount to the HVH 21, while receiving an HVH actually consumed current amount HAC from the HVH 21. The ECU 32 receives a raising actually supplied current amount RAC from the charger 31. Specific contents of these current amounts will be described later.

The battery 10 is a secondary battery such as a nickel metal hydride battery or a lithium ion battery. A current sensor 11 detects a charging current flowing into the battery 10 and outputs a charging current amount CC to the ECU 32.

The heater 20 is a heating device that raises the temperature of the battery 10. The heater 20 is composed of a part of the heat management device mounted on the vehicle 3. The heat management device is a device for performing cooling/heating operations and cooling/heating of a transaxle (not shown), the battery 10, and the like. In the heater 20 in FIG. 1, only the parts required for constituting the heater 20 are extracted from the heat management device to be shown. The heater 20 of the embodiment shown in FIG. 1 has a first thermal circuit 20a and a second thermal circuit 20b. A heat medium flows inside each of the first thermal circuit 20a and the second thermal circuit 20b.

The first thermal circuit 20a includes an HVH 21, a pump 22, a three-way valve 23, a heater core 24, a high-temperature radiator 25, and a water temperature sensor 28. The HVH 21 is an electric heater. The HVH 21 is driven by internal power from the battery 10 or external power supplied from the external power source 2. The pump 22 sends out the heat medium in the first thermal circuit 20a in the arrow direction. The water temperature sensor 28 measures the temperature of the heat medium output from the HVH 21. Temperature information TE indicating the measured temperature is transmitted to the ECU 32. The three-way valve 23 switches the flow paths between a flow path P1 through which the heat medium flows to the heater core 24 and a flow path P2 through which the heat medium flows to the high-temperature radiator 25. The heater core 24 heats the vehicle cabin by heat exchange between the heat medium and the air in the vehicle cabin. The high-temperature radiator 25 cools the heat medium by heat exchange with the outside air.

The second thermal circuit 20b includes a low-temperature radiator 26, a pump 27 and the battery 10. The low-temperature radiator 26 cools the heat medium by heat exchange with the outside air. The battery 10 is heated or cooled by heat exchange with the heat medium.

A heating operation of the battery 10 will be described. The charging control unit 30 operates the HVH 21 to heat the heat medium. The heated high-temperature heat medium flows into the high-temperature radiator 25. The heat of the heat medium flowing through the high-temperature radiator 25 is transferred to the heat medium flowing through the low-temperature radiator 26 (arrow A0). The heat medium flowing through the low-temperature radiator 26 can thus be heated. The heated heat medium flows into the battery via the second thermal circuit 20b, and the battery 10 is heated.

Issues in External Charging of Related Art

Figure 2A:
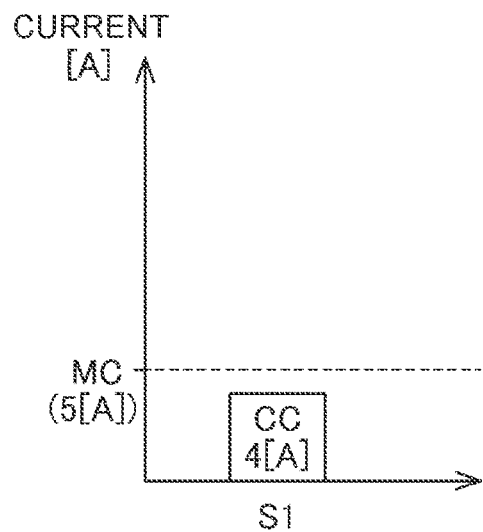
FIG. 2A is a diagram illustrating control of external charging according to the related art and the present embodiment.

Issues in external charging of the related art will be described with reference to FIG. 2A. In the present specification, a case of charging with direct current will be described. Also, a case will be described in which the supplied power during charging is controlled by controlling the current value under the voltage determined by the battery 10. In this case, the control of the current value and the control of the power amount can be regarded as synonymous.

When a user connects the connection plug 2p to the inlet 40 and inputs a charging start command by a switch (not shown), external charging for the battery 10 starts. In step S1, the charging control unit 30 calculates the charging current amount CC that is the maximum current value that can be used for charging the battery 10. The charging current amount CC can be calculated by various methods. In the embodiment, the charging current amount CC is obtained based on a charging current allowable value Win of the battery. In the example of FIG. 2A, the charging current amount CC is calculated as 4 [A] in step S1.

The charging control unit 30 requests the charging current amount CC calculated in step S1 to the external power source 2 as the requested current amount RC. However, a minimum current value MC that can be output is set in advance for the external power source 2. The lower the performance of the external power source 2, the higher the minimum current value MC. Therefore, when the requested current amount RC is less than the minimum current value MC of the external power source 2, there is a case where charging by the external power source 2 is not possible. In the example of FIG. 2A, charging is not possible because the minimum current value MC of the external power source is 5 [A].

There is a case where the battery 10 is heated by the heater during external charging. When a part of the charging current amount CC is used to operate the heater, a charging current amount to the battery 10 is reduced, resulting in a longer charging time. Moreover, when the heater is operated using the battery 10, there is a case where the state of charge (SOC) decreases.

Control of External Charging in Embodiment

Figure 2B:
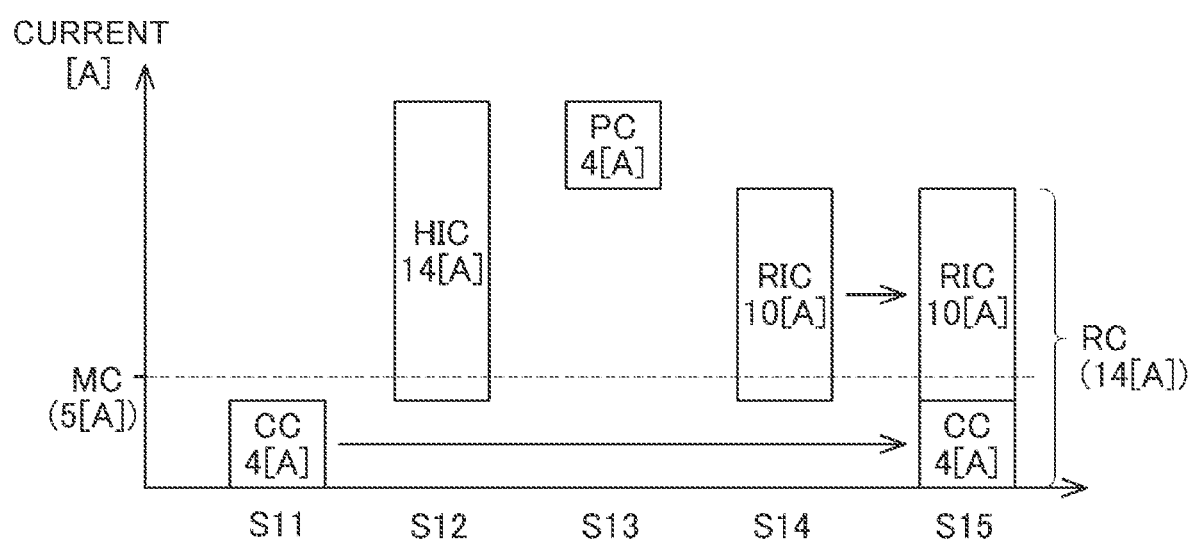
FIG. 2B is a diagram illustrating control of the external charging according to the related art and the present embodiment.

Control of external charging in the embodiment will be described with reference to FIG. 2B. In step S11, the charging control unit 30 obtains the charging current amount CC. In the example of FIG. 2B, the charging current amount CC is calculated as 4 [A].

In step S12, the charging control unit 30 calculates an HVH indicated current amount HIC. The HVH indicated current amount HIC is a current amount required for heating the battery 10 by the heater 20. In other words, the HVH indicated current amount HIC is information indicating the current amount consumed by the heater 20. The HVH indicated current amount HIC can be calculated by various methods. For example, it may be calculated based on the difference between the temperature information TE measured by the water temperature sensor 28 and a target temperature TT. Alternatively, for example, it may be calculated by driving the heater 20 and confirming the current consumption. In the example of FIG. 2B, the HVH indicated current amount HIC is calculated as 14 [A].

In step S13, the charging control unit 30 calculates a predetermined current amount PC corresponding to a response time RT of the external power source 2. The response time RT and the predetermined current amount PC will be described later. In the example of FIG. 2B, the predetermined current amount PC is calculated as 4 [A]. In step S14, the charging control unit 30 subtracts the predetermined current amount PC from the HVH indicated current amount HIC. As a result, a raising indicated current amount RIC is calculated. In the example of FIG. 2B, the raising indicated current amount RIC is calculated as 10 [A].

In step S15, the charging control unit 30 sets the total current amount of the charging current amount CC and the raising indicated current amount RIC as the requested current amount RC. In the example of FIG. 2B, the requested current amount RC is calculated as 14 [A]. The charging control unit 30 requests the calculated requested current amount RC to the external power source 2 via the signal line 11S. In the example of FIG. 2B, since the requested current amount RC (14 [A]) exceeds the minimum current value MC (5 [A]) of the external power source, charging is possible. The processing from steps S11 to S15 is repeatedly executed at a predetermined cycle (e.g., 100 ms).

According to this configuration, the current amount in which the raising indicated current amount RIC required for heating by the heater 20 is added to the charging current amount CC required for charging the battery 10 can be requested to the external power source 2 as the requested current amount RC. A large requested current amount RC can be requested compared to a case where only the charging current amount CC is requested. Since it is possible to suppress the requested current amount RC from falling below the minimum current value MC that the external power source 2 can output, charging by the external power source 2 can be surely executed.

Further, when the battery 10 is externally charged while being heated by the heater, a part of the charging current amount CC will not be used for the heater operation. The charging time can be suppressed from becoming long. Moreover, since the heater is not operated using the battery 10, it is possible to suppress the decrease in SOC.

Issue in Control of Raising Indicated Current Amount RIC

An issue in the control of the raising indicated current amount RIC will be described using comparative examples in FIGS. 3A, 3B, and 3C. The control method of the comparative examples does not take the response time RT of the external power source 2 into consideration.

FIG. 3A is a diagram showing temporal changes in the HVH indicated current amount HIC, the HVH actually consumed current amount HAC, the raising indicated current amount RIC, and the raising actually supplied current amount RAC. The HVH indicated current amount HIC is a current amount used for heat generation indicated to the HVH 21. The HVH actually consumed current amount HAC is a current amount actually used for heat generation in the HVH 21. The HVH actually consumed current amount HAC may be a monitor value or a value obtained by correcting an error in the monitor value. The HVH actually consumed current amount HAC is a value that is lower than the HVH indicated current amount HIC by a tolerance amount VA. The tolerance amount VA is the tolerance between the HVH indicated current amount HIC and the actual power consumption, and is a value determined by the performance of the HVH 21. The HVH actually consumed current amount HAC changes by following the change in the HVH indicated current amount HIC. The raising indicated current amount RIC is a current amount for raising the requested current amount RC by the HVH actually consumed current amount HAC. The raising indicated current amount RIC changes by following the change in the HVH actually consumed current amount HAC. The raising actually supplied current amount RAC (dotted line) is a current amount that is actually supplied from the external power source 2 in response to the raising indicated current amount RIC. The raising actually supplied current amount RAC follows the change in the raising indicated current amount RIC with a delay of the response time RT.

FIG. 3B is a diagram showing a temporal change in the temperature information TE. The temperature information TE is the information indicating the temperature of the heat medium output from the HVH 21. FIG. 3C is a diagram showing a temporal change in an excessive current amount OC. The excessive current amount OC is a current amount that has exceeded the charging current allowable value Win of the battery 10.

At time t1, the HVH indicated current amount HIC rises, and heating of the HVH 21 starts. The raising indicated current amount RIC and the raising actually supplied current amount RAC rise by following the HVH indicated current amount HIC and the HVH actually consumed current amount HAC. From time t2 to time t3, these four current amounts become constant values.

When the temperature information TE reaches the target temperature TT at time t3, the HVH indicated current amount HIC and the HVH actually consumed current amount HAC start decreasing at a predetermined decrease rate (arrow A1). Accordingly, the raising indicated current amount RIC also follows and starts decreasing.

However, the external power source 2 has the response time RT. The response time RT is a delay time from when the raising indicated current amount RIC is requested to the external power source 2 until the external power source 2 supplies the raising actually supplied current amount RAC in response to the requested raising indicated current amount RIC. That is, the raising indicated current amount RIC requests the external power source 2 to start decreasing at time t3. However, the external power source 2 starts decreasing the raising actually supplied current amount RAC at time t6 at which the response time RT has elapsed from time t3. Then, from time t3 to time t6, the HVH indicated current amount HIC, the HVH actually consumed current amount HAC, and the raising indicated current amount RIC decrease at the same inclination, while the raising actually supplied current amount RAC is maintained at a constant value. As a result, at time t4, the HVH actually consumed current amount HAC falls below the raising actually supplied current amount RAC. Since the surplus current that has not been consumed by the HVH 21 flows into the battery 10, the excessive current amount OC starts rising (arrow A2). When the excessive current amount OC reaches an upper limit value UL at time t5, charging stops to protect the battery 10 (see area R1).

Control Method of Raising Indicated Current Amount RIC in First Embodiment

With reference to FIGS. 4A, 4B, and 4C, a control method for the raising indicated current amount RIC according to the first embodiment will be described. The control method of the first embodiment takes the response time RT of the external power source 2 into consideration. The contents of FIGS. 4A, 4B, and 4C are the same as the contents of FIGS. 3A, 3B, and 3C described above.

In step S13 described above, the charging control unit 30 calculates the predetermined current amount PC corresponding to the response time RT. A specific description will be given. The maximum value of the change rate is set in advance for the HVH indicated current amount HIC. The maximum value is also set in advance for the response time RT according to the charging standard. Therefore, the maximum change amount in the HVH indicated current amount HIC within the response time RT can be calculated by multiplying the maximum value of the change rate of the HVH indicated current amount HIC by the maximum value of the response time RT. The predetermined current amount PC is determined to be a value equal to or larger than the maximum change amount of the HVH indicated current amount HIC. In the embodiment, the maximum value of the decrease rate of the HVH indicated current amount HIC is 0.5 [A/sec], and the maximum value of the response time RT is 8 [sec]. Therefore, the maximum change amount in the HVH indicated current amount HIC is 4.0 [A]. Accordingly, in the embodiment, the predetermined current amount PC is set to 4.0 [A].

In step S14 described above, the charging control unit 30 subtracts a margin amount MA and the predetermined current amount PC from the HVH indicated current amount HIC (see arrow A3). As a result, the raising indicated current amount RIC is obtained.

At time t3 in FIGS. 4A, 4B, and 4C, the HVH indicated current amount HIC starts decreasing. From time t3 to time t6, the HVH indicated current amount HIC, the HVH actually consumed current amount HAC, and the raising indicated current amount RIC decrease at the same inclination. On the other hand, the raising actually supplied current amount RAC is maintained at a constant value. However, as described above, the raising indicated current amount RIC is set to be lower in advance by the predetermined current amount PC. Therefore, even at time t6 after the response time RT has elapsed, the HVH actually consumed current amount HAC does not fall below the raising actually supplied current amount RAC (see area R2). As a result, it is possible to suppress a rise in the excessive current amount OC. Therefore, it is possible to restrain an occurrence of a situation in which charging is stopped.

Second Embodiment

Figure 5:
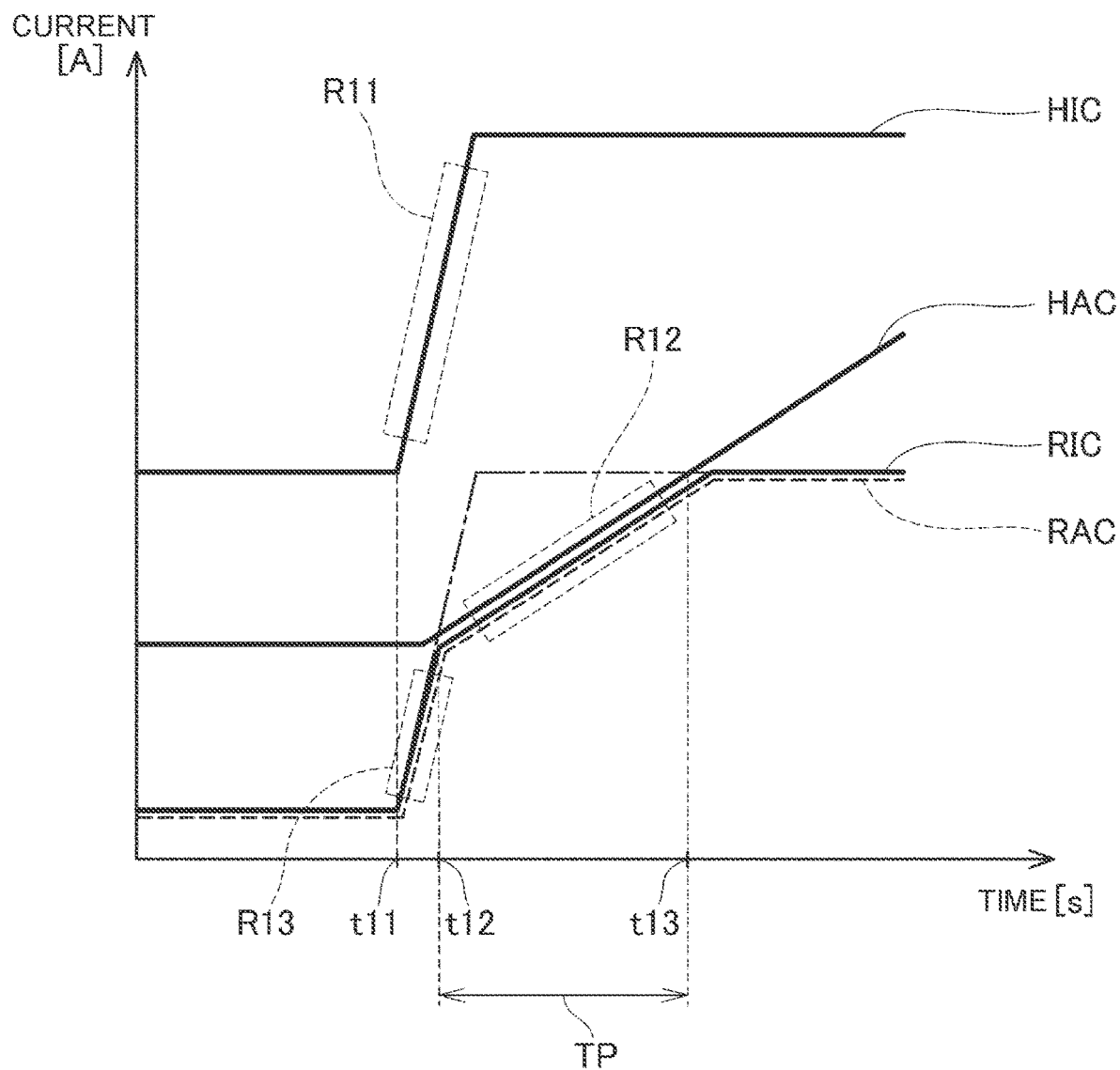
FIG. 5 is a diagram illustrating a control method for the raising indicated current amount RIC according to a second embodiment.

With reference to FIG. 5, a control method for the raising indicated current amount RIC of the second embodiment will be described. In the first embodiment, the control method when the HVH indicated current amount HIC decreases has been described. In the second embodiment, the control method when the HVH indicated current amount HIC rises will be described. The same contents as in the first embodiment are designated by the same reference signs, and the description thereof is omitted.

In the second embodiment, a case will be described where the maximum value of an increase rate of the HVH indicated current amount HIC is greater than the maximum value of an increase rate of the HVH actually consumed current amount HAC. In this case, when the heating of the HVH 21 is started at time t11, the rising inclination of the HVH actually consumed current amount HAC (area R12) becomes smaller than the rising inclination of the HVH indicated current amount HIC (area R11). On the other hand, the raising indicated current amount RIC is obtained by subtracting the predetermined current amount PC from the HVH indicated current amount HIC. Therefore, the rising inclination of the raising indicated current amount RIC (area R13) becomes large as the rising inclination of the HVH indicated current amount HIC (area R11). Then, as indicated by a long dashed short dashed line, during a transitional period TP from time t12 to t13, the raising indicated current amount RIC exceeds the HVH actually consumed current amount HAC. When the raising indicated current amount RIC exceeds the HVH actually consumed current amount HAC, the excessive current amount OC rises, which may result in a problem.

Therefore, in the technique of the second embodiment, the smaller one of the "current amount obtained by subtracting the predetermined current amount PC from the HVH indicated current amount HIC" and the "HVH actually consumed current amount HAC" is decided to be the raising indicated current amount RIC. As a result, in the transitional period TP, the HVH actually consumed current amount HAC can be followed by the raising indicated current amount RIC (area R12). Accordingly, both when the HVH indicated current amount HIC decreases (first embodiment, FIGS. 4A, 4B, and 4C) and when the HVH indicated current amount HIC increases (second embodiment, FIG. 5), the HVH actually consumed current amount HAC does not fall below the raising actually supplied current amount RAC. Since it is possible to suppress a rise in the excessive current amount OC, it is possible to restrain an occurrence of a situation in which charging is stopped.

Third Embodiment

Figure 6:
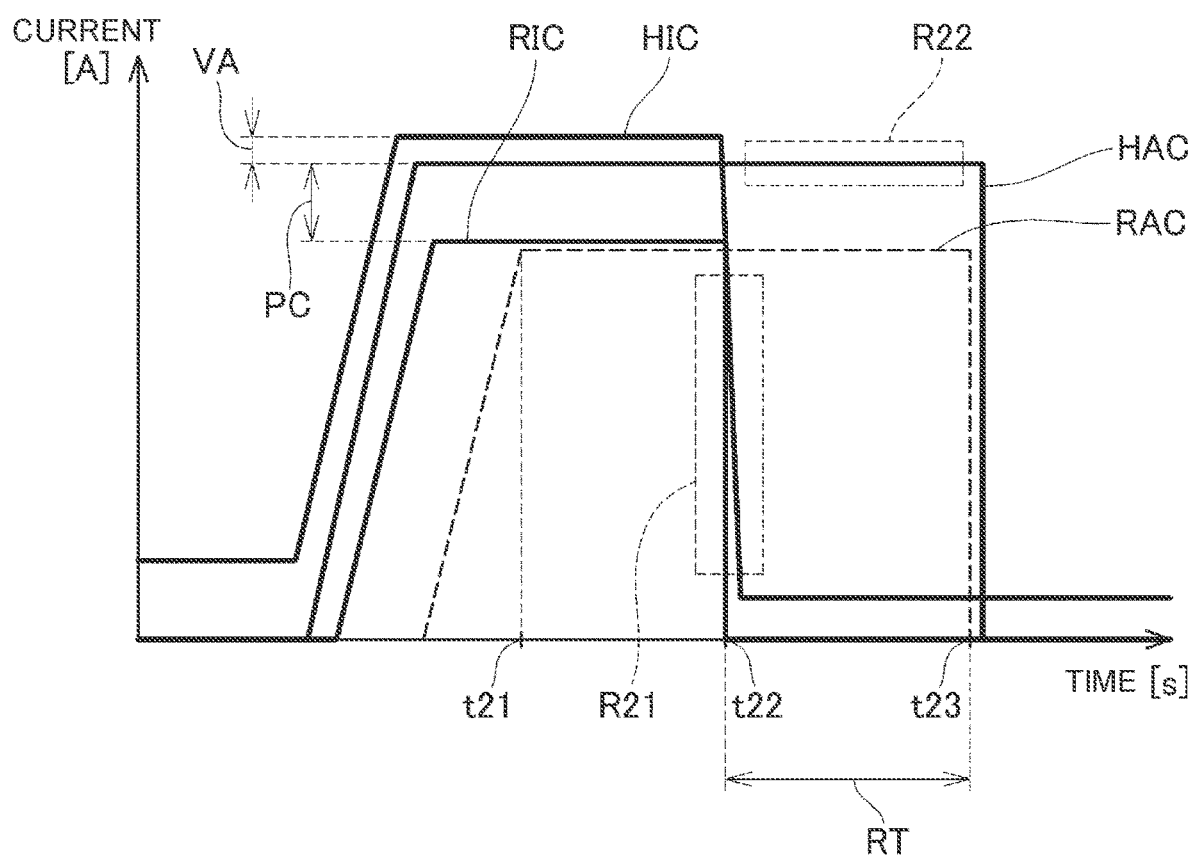
FIG. 6 is a diagram illustrating a control method for the raising indicated current amount RIC according to a third embodiment.

With reference to FIG. 6, a control method for the raising indicated current amount RIC of the third embodiment will be described. In the first embodiment, the control method when the HVH indicated current amount HIC decreases at a constant rate has been described. In the third embodiment, the control method in a case where the HVH indicated current amount HIC is rapidly decreased when an abnormality occurs or the like will be described. The same contents as in the first embodiment are designated by the same reference signs, and the description thereof is omitted.

From time t21 to time t22, the HVH indicated current amount HIC, the HVH actually consumed current amount HAC, the raising indicated current amount RIC, and the raising actually supplied current amount RAC are maintained at a constant value. Here, a case where a heater stop event occurs at time t22 will be described. The heater stop event is an event in which power consumption in the HVH 21 stops. Examples of the heater stop event include a case where an air conditioning operation (cooling etc.) is performed, a case where cooling of various parts such as a power control unit (PCU) is requested, and a case where an air conditioning part or the main body of the HVH 21 breaks down.

As described above in the first embodiment, the maximum value of the decrease rate is set in advance for the HVH indicated current amount HIC and the raising indicated current amount RIC. However, when the heater stop event occurs, the HVH indicated current amount HIC and the raising indicated current amount RIC rapidly decrease beyond the maximum value of the decrease rate (area R21).

When the HVH actually consumed current amount HAC rapidly decreases by following the HVH indicated current amount HIC, the HVH actually consumed current amount HAC falls below the raising actually supplied current amount RAC. In this case, the excessive current amount OC rises, which may result in a problem.

Therefore, in the technique of the third embodiment, the charging control unit 30 performs a processing of continuing the operation of the HVH 21 when a rapid decrease phenomenon occurs in which the raising indicated current amount RIC decreases beyond the maximum value of the decrease rate. Specifically, the operation of the HVH 21 is continued from the time when the rapid decrease phenomenon occurs (time t22) until the time when the response time RT or more has elapsed (time t23). As a result, without the HVH actually consumed current amount HAC following the HVH indicated current amount HIC which has suddenly decreased, a constant value can be maintained (area R22). The HVH actually consumed current amount HAC does not fall below the raising actually supplied current amount RAC. Therefore, a rise in the excessive current amount OC can be suppressed.

The processing of continuing the operation of the HVH 21 may be in various control modes. For example, the charging control unit 30 may transmit information indicating to continue the operation to the HVH 21 in response to detection of occurrence of the rapid decrease phenomenon of the raising indicated current amount RIC. Then, in response to the elapse of the response time RT, information indicating the end of the continuous operation may be transmitted to the HVH 21.

Although the embodiments have been described in detail above, the embodiments are merely examples and do not limit the scope of claims. The techniques described in the claims include various modifications and alterations of the specific examples illustrated above.

Modification

The technique of the present specification can also be applied to a mode in which alternating current is supplied from the external power source 2. Moreover, although the case where the current value supplied from the external power source 2 is controlled has been described, the present disclosure is not limited to this mode. The technique of the present specification can be applied to a mode in which a voltage value is controlled or a mode in which a current value and a voltage value are controlled simultaneously.

In the third embodiment, the processing of continuing the operation of the HVH 21 may be in various control modes. The value of the HVH actually consumed current amount HAC may be held until the response time RT has elapsed in response to the detection of the rapid decrease phenomenon of the raising indicated current amount RIC.

The heater 20 is not limited to the mode using the heat medium. For example, a heater using electricity or a heater using exhaust heat from an engine may be used.

The technical elements described in the present specification or the drawings exhibit technical usefulness alone or in various combinations, and are not limited to the combinations described in the claims at the time of filing. In addition, the techniques illustrated in the present specification or the drawings achieve a plurality of objectives at the same time, and achieving one of the objectives itself has technical usefulness.

The charging current amount CC is an example of a first power amount. The raising indicated current amount RIC is an example of the second power amount. The predetermined current amount PC is an example of the predetermined power amount. The HVH indicated current amount HIC is an example of the indicated power amount.

What is claimed is:

1. A vehicle comprising:
a secondary battery;
a heater configured to be able to raise a temperature of the secondary battery; and
a charging control unit configured to be connectable to an external power source, wherein
the charging control unit is configured to be able to output electric power supplied from the external power source to the secondary battery and the heater when connected to the external power source,
the charging control unit is configured to be able to request the external power source for a requested power amount, and to be able to receive a supply of a supplied power amount in accordance with the requested power amount from the external power source, and
the charging control unit requests the external power source for the requested power amount including a first power amount required for charging the secondary battery and a second power amount required for heating by the heater, wherein:
there is a response time that is time from when the requested power amount is requested to the external power source until the supplied power amount is supplied by the external power source in response to the requested power amount that has been requested; and
the charging control unit executes
a processing of calculating a predetermined power amount corresponding to the response time,
a processing of acquiring an indicated power amount that indicates electric power consumed by the heater, and
a processing of setting a power amount obtained by subtracting the predetermined power amount from the indicated power amount as the second power amount.

2. The vehicle according to claim 1, wherein:
a maximum value of a change rate is set in advance for the indicated power amount; and
the predetermined power amount is a value equal to or greater than a value calculated by multiplying the maximum value of the change rate by the response time.

3. A vehicle comprising:
a secondary battery;
a heater configured to be able to raise a temperature of the secondary battery; and
a charging control unit configured to be connectable to an external power source, wherein
the charging control unit is configured to be able to output electric power supplied from the external power source to the secondary battery and the heater when connected to the external power source,
the charging control unit is configured to be able to request the external power source for a requested power amount, and to be able to receive a supply of a supplied power amount in accordance with the requested power amount from the external power source, and
the charging control unit requests the external power source for the requested power amount including a first power amount required for charging the secondary battery and a second power amount required for heating by the heater, wherein:
there is a response time that is time from when the requested power amount is requested to the external power source until the supplied power amount is supplied by the external power source in response to the requested power amount that has been requested; and
the charging control unit executes
a processing of calculating a predetermined power amount corresponding to the response time,
a processing of acquiring an indicated power amount that indicates electric power consumed by the heater,
a processing of acquiring an actually consumed power amount indicating electric power actually consumed by the heater, and
a processing of setting, as the second power amount, a smaller power amount of a power amount obtained by subtracting the predetermined power amount from the indicated power amount and the actually consumed power amount.

4. The vehicle according to claim 3, wherein:
a maximum value of a change rate is set in advance for the indicated power amount; and
the predetermined power amount is a value equal to or greater than a value calculated by multiplying the maximum value of the change rate by the response time.

5. A vehicle comprising:
a secondary battery;
a heater configured to be able to raise a temperature of the secondary battery; and
a charging control unit configured to be connectable to an external power source, wherein
the charging control unit is configured to be able to output electric power supplied from the external power source to the secondary battery and the heater when connected to the external power source,
the charging control unit is configured to be able to request the external power source for a requested power amount, and to be able to receive a supply of a supplied power amount in accordance with the requested power amount from the external power source, and
the charging control unit requests the external power source for the requested power amount including a first power amount required for charging the secondary battery and a second power amount required for heating by the heater, wherein:
there is a response time that is time from when the requested power amount is requested to the external power source until the supplied power amount is supplied by the external power source in response to the requested power amount that has been requested;
a maximum value of a decrease rate is set in advance for the requested power amount; and
when a rapid decrease phenomenon occurs in which the requested power amount decreases beyond the maximum value of the decrease rate, the charging control unit continues an operation of the heater until the response time or more has elapsed from a time when the rapid decrease phenomenon occurred.

* * * * *